United States Patent [19]

Dockus et al.

[11] Patent Number: 4,701,127
[45] Date of Patent: Oct. 20, 1987

[54] CONTROLLED ATMOSPHERE CAPSULE FOR FLUXLESS BRAZING

[75] Inventors: Kostas F. Dockus, Cicero; John L. Zambrow, Lincolnshire, both of Ill.

[73] Assignee: Borg-Warner Corporation, Chicago, Ill.

[21] Appl. No.: 448,562

[22] Filed: Dec. 10, 1982

[51] Int. Cl.[4] .................. F27D 1/18; C21D 1/06
[52] U.S. Cl. .................. 432/242; 432/206; 432/198; 266/258; 266/256
[58] Field of Search .......... 432/26, 198, 206, 242, 432/254.2; 266/256, 263, 264

[56] References Cited

U.S. PATENT DOCUMENTS

| | | | |
|---|---|---|---|
| 1,914,403 | 6/1933 | Cope | 266/258 |
| 1,938,306 | 12/1933 | Webb | 432/206 |
| 2,714,760 | 8/1955 | Boam et al. | 29/196 |
| 2,834,590 | 5/1958 | Pugh | 432/206 |
| 2,855,193 | 10/1958 | Gilbert | 432/198 |
| 3,073,268 | 1/1963 | Cole | 113/99 |
| 3,375,570 | 4/1968 | Dubusker et al. | 29/472.3 |
| 3,670,397 | 6/1972 | Lewis | 29/472.3 |
| 3,693,955 | 9/1972 | Wald et al. | 266/256 |
| 3,751,219 | 8/1973 | Kitchel | 432/242 |

*Primary Examiner*—Henry C. Yuen
*Attorney, Agent, or Firm*—Richard J. Schlott

[57] ABSTRACT

A controlled environment capsule for fluxless brazing comprising an open-bottom box, an end-plate and a foil gasket sealing means. Diffusion plates are disposed within the interior of the box and connected to an external source of inert gas. The inert gas is uniformly distributed over the work piece, excluding air from the capsule and the work piece by being maintained at a positive pressure relative to the external environment.

4 Claims, 4 Drawing Figures

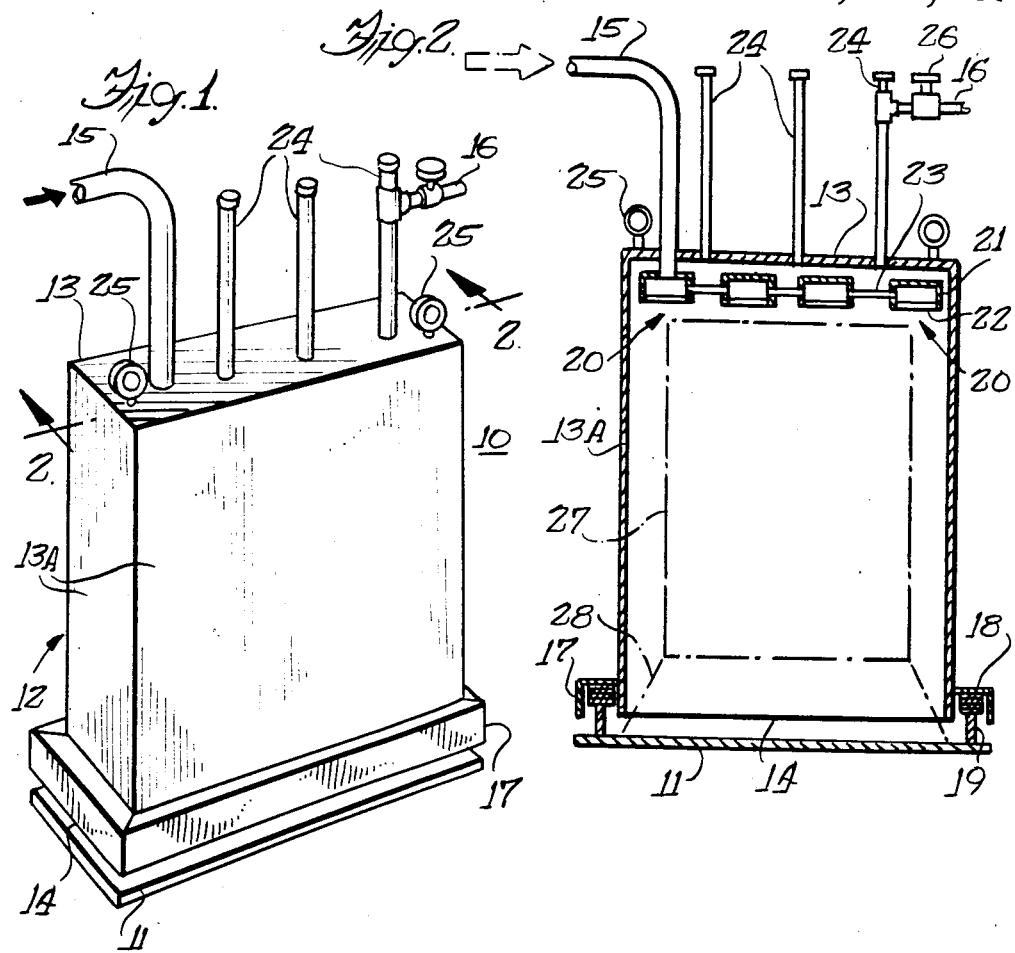
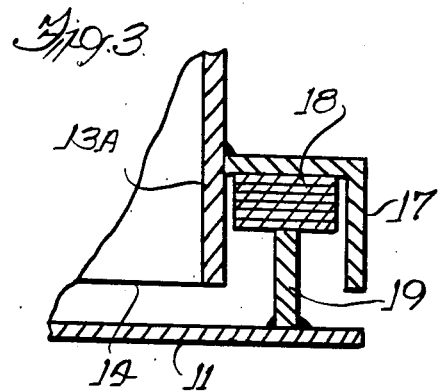
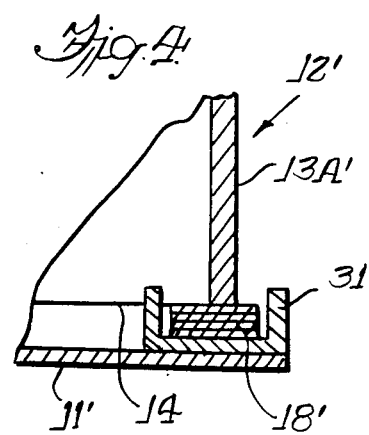

CONTROLLED ATMOSPHERE CAPSULE FOR FLUXLESS BRAZING

BACKGROUND OF THE INVENTION

This invention relates to fluxless brazing and more particularly to an apparatus for fluxless brazing in a controlled atmosphere; especially for aluminum workpieces or components such as oil coolers, radiators, heater cores, evaporators, blowers, etc.

The fluxless brazing of aluminum components, such as aluminum radiators and heat exchangers, is normally accomplished by heating the assembly to the brazing temperature while excluding oxygen, thus avoiding oxidation of the parts and preventing incomplete joining. In general, brazing furnaces having a controlled atmosphere or vacuum have been developed for these purposes and, although these methods have been quite adequate for producing brazed parts, proper sealing of a furnace is difficult. The furnaces are generally large, accomodating a number of such component assemblies for batch processing and thus require copious quantities of inert gases or reducing gases to maintain the controlled brazing environment. Should leakage occur and allow the influx of even minor amounts of air, water vapor or other contamination, circulation within the oven exposes the entire batch of parts to contamination and possible loss. Further, where a conveyor furnace is employed for the continuous production of brazed parts, complex door/air locks must be provided for admitting and removing the assemblies while protecting the integrity of the inert atmosphere within the furnace.

Alternative methods have been devised in which the component assembly to be braized is sealed within a box or capsule fitted with an appropriate purging system. The box is then purged to establish the desired environment before being heated by ordinary means such as a furnace or in a fluidized bed heating device to accomplish the brazing. Typical processes employing such capsules are disclosed for example in U.S. Pat. Nos. 3,375,570 and 3,073,268. These prior art processes generally employ seam welding of the box or capsule to accomplish the necessary sealing with the resulting disadvantage that the capsule must be destroyed to obtain the brazed article.

In the U.S. Pat. No. 2,714,760 there is disclosed a method for brazing high temperature alloy parts wherein the brazing step is accomplished by placing the assembly into a retort within a brazing furnace. The retort is fitted with a lid and sealed by means of a sand seal. A reducing gas is supplied to the retort, escaping through the sand seal to maintain the necessary reducing environment. The purging of the retort is accomplished within the furnace, no provision for transfer of the sealed, purged capsule being made.

SUMMARY OF THE INVENTION

The present invention provides a controlled environment capsule for fluxless brazing, and more particularly for the fluxless brazing of aluminum parts or components. The capsule is fitted with a purge system including spaced diffusion plates to ensure a uniform flow of inert gas over the parts or assembly to be brazed, and is sealed by a deformable metallic foil gasket. The seal gasket is sufficiently porous to permit outflow of the purging gas, and the seal is readily made and broken by ordinary manipulation, thus avoiding the use of seam-welding techniques or complex clamping devices.

The capsule of this invention can be sealed and purged outside the furnace, increasing the level of furnace productivity. At the end of the brazing cycle, the brazed assembly can be cooled in a controlled atmosphere, or quickly quenched with a stream of cold air or other gaseous media to obtain a desired temper. The capsule can be made to closely fit the work piece, thus reducing the gas usage and purging time, and the work piece is heated very uniformly. Any suitable source of heat including induction heating, resistance heating and fluidized beds may be employed without fear of contaminating the controlled environment surrounding the work piece.

Also, the capsule of the present invention provides a novel capsule design with an improved and more economical means to supply and maintain high purity of the protective gas, thus ensuring a good brazing quality. Good brazing of aluminum components can thus be carried out with a minimum capital outlay and maximum output as compared with existing vacuum or controlled atmosphere furnaces.

BRIEF DESCRIPTION OF THE DRAWINGS

FIG. 1 is a perspective view of a controlled environment capsule of this invention.

FIG. 2 is a vertical cross-sectional view taken along line 2—2 of FIG. 1.

FIG. 3 is an enlarged partial cross-sectional view of the seal area.

FIG. 4 is an enlarged partial cross-sectional view of the seal area, showing an alternative embodiment thereof.

DETAILED DESCRIPTION OF THE PREFERRED EMBODIMENT

Referring now to the drawings, in FIG. 1 there is shown a controlled environment capsule 10 constructed according to the principles of this invention, including an end plate 11, a box 12 comprising a closed end 13, integral sidewalls 13A depending from end 13, and an open end 14. Box 12 is fitted with a gas inlet 15, a venting tube 16 and a first or peripheral flange 17 at the open end 14. In the cross-sectional view shown in FIG. 2, it will be seen that flange 17 has the form of an inverted U circumscribing the open end 14 of box 12. Received within flange 17 is a metallic foil gasket 18, said gasket adapted to contact a mating second flange 19 located on end plate 11, the second flange 19 extending upwardly from the end plate and adapted to be received within flange 17.

Together, first flange 17, second flange 19 and the metallic foil gasket 18 form a foil gasket sealing means. As may be seen in greater detail in FIG. 3, the metallic foil gasket 18 comprises a layered foil structure which may be formed from any suitable metallic foil including copper, brass, aluminum and the like. Gasket 18 is deformable and will be compressed under the weight of the box 12, thus forming a seal with the end plate 11 to prevent the intrusion of air into the open end 14. The box 12 and end plate 11 may optionally be held together through use of clamping means (not shown) which may be any of a variety of conventional clamping devices including c-clamps, band clamps, quick release clamps and the like. Such clamping means will be particularly useful where the capsule will be lifted for transport.

Disposed within the box 12 near the top 13 are four interconnected diffusion plates 20 which include housings 21 for suitable porous metallic or ceramic plates 22 positioned therein. The manufacture of ceramic or metallic porous sheet material is well known in the art and any of the variety of such materials as are commercially available may be employed in the practice of this invention provided that the material selected will withstand the temperatures employed for brazing. The diffusion plates, interconnected by tubes 23 with inlet 15, serve to distribute the gas stream from inlet 15 to provide a uniform flow of gas over the area. The uniformly-distributed inflow of an inert gas in this manner provides for downward displacement of air contained within box 12, and a more complete and rapid purging of air from the system. The uniform flow also tends to ensure that the workpiece will be enveloped in an inert gas stream throughout the purging and brazing cycles. The location of the work piece 27 and support pedestal 28, which do not form a part of this invention, are shown by broken lines.

Lifting rings 25 are optionally provided on the closed end 13 to facilitate removal and placement of box 12 on end plate 11. Also shown in FIGS. 1 and 2 are optional tubes 24 for thermocouple probes (not shown) to indicate temperature of the workpiece at various locations. One of tubes 24 may be fitted with a vent valve 26 as shown to permit a rapid initial purging or vacuum purging of the box or capsule.

The capsule of this invention is assembled for brazing parts in the following manner. End plate 11 is placed upon the work surface. For convenience, the work surface may be a wheeled dolly or other conveying means for transporting the assembled capsule to the furnace. The pedestal and assembled work piece are then placed upon the end plate. Box 12, with foil gasket 18 inserted into the U-shaped flange 17, is then lowered onto the end plate by means of a hoist or other lifting device. It will be understood that box 12 and end plate 11 are appropriately sized to mate and to surround the work piece and pedestal with adequate working clearances, however, the clearance between the box and the work piece is otherwise not critical. Upon assembly of the box 12 and end plate 11, withdrawing of the lifting means, the foil gasket 18 within flange 17 is deformed by compression from the weight of the box 12 at mating flange 19 to form a seal. Optional clamping means may be employed to further secure the box 12 to end plate 11 and maintain the integrity of the seal, particularly during a subsequent transporting of the capsule. The gas inlet 15 is then connected to a source of dry, inert gas such as nitrogen or argon, and the inert gas is allowed to flow into the box through the diffusion plates 20, displacing the air downwardly within the capsule to be vented through the gasket 18. A slight positive pressure is maintained, with a continuous flow of inert gas at a rate of about 5 to 50 cubic feet per hour to prevent leakage of air into the capsule.

It will be understood that the purging may also be accomplished by evacuating the capsule through the (optional) vent valve 26 and then admitting the inert gas, whereby gasket 18 serves to prevent the intrusion of air into the capsule during the vacuum cycle and then permits a slow escape of the inert gas upon establishing a slight positive internal pressure. The continuous flow of inert gas through the diffusion plates serves to envelop the work piece with inert gas and further protect the surfaces during the brazing cycle.

The capsule is then transported into and through the furnace or other heating means such as a heated, fluidized bed and heated to the brazing temperature, e.g. to 1100°–1150° F. for aluminum brazalloy, maintained at that temperature until brazing is complete and then allowed to cool to handling temperature. The inert gas flow is continued throughout the brazing cycle. To further facilitate the heating, the inert gas may be passed through a pre-heating device, such as a coil of tubing surrounding the capsule, before entering the capsule.

After cooling, the capsule is disassembled by releasing the clamping means, if employed, and simply lifting the box from the end plate by use of a hoist or other lifting means. The foil gasket is disposable and is replaced before re-use of the capsule.

In FIG. 4 there is shown an alternate embodiment having a foil gasket seal means including a U-shaped flange 31 attached to end-plate 11' and adapted to receive the sidewalls 13A' of box 12'. Metallic foil gasket 18' is disposed within flange 31, and flange 31 receives the depending sidewalls 13A' of box 12' at the open end 14'. In this alternate embodiment, the foil gasket 18' is deformed by compression within flange 31 by the edges of sidewalls 13A' of box 12' to form a seal.

It will be seen that the capsule of this invention provides several advantages over the prior art. The time consuming and difficult step of welding the capsule to establish a seal is avoided, as is the companion step of cutting open the capsule to remove the brazed part. The capsule may be quickly assembled outside the heating means, and purged to establish the inert environment without unnecessarily tying up the furnace.

We claim:

1. An apparatus for use in brazing comprising an open-bottom, box-like container having a closed end and integral sidewalls, an end plate covering said open bottom, foil gasket sealing means disposed between said end plate and the periphery of said open bottom, at least one diffusion plate disposed within the interior of said container adjacent said closed end and a gas inlet tube connected to said closed end and communicating with said diffusion plate.

2. The apparatus of claim 1 wherein said foil gasket sealing means includes a first flange, a second flange and a metallic foil gasket, said first flange extending outwardly from said walls in the form of an inverted U circumscribing said open bottom, said second flange being upwardly directed from said end plate and received within said first flange and said metallic foil gasket being disposed within said first flange and contacting said second flange.

3. The apparatus of claim 1 wherein said foil gasket means includes a flange and a metallic foil gasket, said flange being upwardly disposed from said end plate to form a u-shaped member adapted to receive the sidewalls of said container, and said metallic foil gasket being disposed within said flange and contacting said sidewalls.

4. The apparatus of claim 1 further comprising a vent tube and valve attached to said closed end and communicating with the interior of said container.

* * * * *